(12) United States Patent
Di Rosa

(10) Patent No.: US 7,665,945 B2
(45) Date of Patent: Feb. 23, 2010

(54) CONTAINER TRANSFER SYSTEM BETWEEN SHIP AND WAREHOUSE

(75) Inventor: Gaetano Di Rosa, Pino Torinese TO (IT)

(73) Assignee: FATA S.p.A., Pianezza TO (IT)

( * ) Notice: Subject to any disclaimer, the term of this patent is extended or adjusted under 35 U.S.C. 154(b) by 250 days.

(21) Appl. No.: 11/634,279

(22) Filed: Dec. 6, 2006

(65) Prior Publication Data
US 2007/0128005 A1  Jun. 7, 2007

(30) Foreign Application Priority Data
Dec. 6, 2005  (IT)  ............ MI2005A2338

(51) Int. Cl.
B63B 27/00 (2006.01)
B63B 35/00 (2006.01)
B65G 67/60 (2006.01)
B66C 5/02 (2006.01)
B66C 19/00 (2006.01)

(52) U.S. Cl. ............ 414/140.4; 414/139.9; 212/325

(58) Field of Classification Search ............ 212/234, 212/235; 414/139.9, 140.1, 140.3, 140.4, 414/141.3, 141.4, 141.6, 142.6, 142.7, 266
See application file for complete search history.

(56) References Cited

U.S. PATENT DOCUMENTS

| | | | |
|---|---|---|---|
| 1,152,879 A * | 9/1915 | Colby et al. ............ | 212/325 |
| 3,812,987 A * | 5/1974 | Watatani ............ | 414/561 |
| 4,431,359 A | 2/1984 | Toniolo | |
| 4,872,798 A | 10/1989 | Ide | |
| 5,603,598 A * | 2/1997 | Hasegawa et al. ........ | 414/140.3 |
| 5,775,866 A * | 7/1998 | Tax et al. ............ | 414/140.3 |
| 5,951,226 A * | 9/1999 | Fantuzzi ............ | 414/141.3 |
| 6,092,969 A * | 7/2000 | Franzen et al. ........ | 414/139.9 |
| 6,435,361 B2 * | 8/2002 | Franzen et al. ............ | 212/325 |
| 6,694,215 B1 * | 2/2004 | Kwon et al. ............ | 700/213 |
| 6,715,977 B2 * | 4/2004 | Dobner et al. ............ | 414/141.3 |
| 6,845,873 B1 * | 1/2005 | Chattey ............ | 212/270 |
| 2001/0002010 A1 * | 5/2001 | Franzen et al. ............ | 212/325 |
| 2003/0108406 A1 | 6/2003 | Takehara et al. | |

FOREIGN PATENT DOCUMENTS

| | | |
|---|---|---|
| EP | 1 106 564 | 6/2001 |
| GB | 1 346 520 | 2/1974 |
| JP | 01313300 A | * 12/1989 |

OTHER PUBLICATIONS

European Search Report dated Mar. 25, 2008.

* cited by examiner

*Primary Examiner*—Gregory W Adams
(74) *Attorney, Agent, or Firm*—Jacobson Holman PLLC

(57) ABSTRACT

A system on land for transfer of containers between ship and land includes cranes for container loading or unloading and stations for transfer of containers operationally associated with the cranes. The transfer stations include an upper platform for reception and support of a container from and to a crane and a lower platform for loading or unloading of containers within and outside of the station. Between the upper platform and the lower platform there are centering and elevator devices which perform the transfer of a container between the two superimposed platforms without intervention of the crane.

14 Claims, 5 Drawing Sheets

CONTAINER TRANSFER SYSTEM BETWEEN SHIP AND WAREHOUSE

BACKGROUND OF THE INVENTION

1. Field of the Invention

This invention relates to a system of transferring containers between a ship and land.

2. State of the Prior Art

In transferring containers from ship to land (for example, within an automatic or semiautomatic warehouse) and vice versa, considerable improvements have been made over time in loading and unloading times of containers, enormously increasing the speed and acceleration of hoisting and translation of the cranes. Complex electronic devices have also been introduced to impose on the shifting trolley a movement law producing a damping effect on the oscillations of the container so as to reduce waiting times during unloading movements.

But a limit was reached beyond which further speed and acceleration increases made on wharf cranes of known type do not produce more appreciable benefits on the total time of unloading operations.

Attempts to increase productivity of cranes for example by hoisting in a single operation two piled or side-by-side containers. But this unloading technique imposes using cranes with capacity double that of a normal wharf crane or unloading only containers with very light loads. In addition, in case of hoisting two superimposed containers, there is a serious problem of safety since the lower container is constrained to the upper one only by the so-called 'twistlocks', of which it is not easy to control the effective strength and for which one cannot be sure that they will not open during the movement. Twistlocks are tools which hold together the various superimposed containers on board ships so as to constitute a single block of containers anchored in turn to the bearing structure of the ship to prevent shifting and falling of the load.

The twistlocks belong to the ship and during unloading remain hooked to the lower part of the container from which they must be removed to allow setting down the containers on land or on a land transport means and to be able to again have available the equipment of the ship for loading of new containers.

In the case of side-by-side containers, safety is greater because the double 'spreader' can be advantageously equipped with a control of completed hooking on both the containers. But there remain limitations due to the need that the relative position of the two containers be always the same and to the difficulty in recovering from land of two containers deposited so close by.

In the known art, cranes have been proposed with two trolleys per winch. The first winch takes a container from the ship and sets it down in a waiting position, prearranged in the crane frame, so as to free itself and be able to go and take the next container. The second winch takes the container from the waiting position and sets it on the ground after an intermediate stop for removal of the twistlocks. With this system, there is a benefit due practically only to the reduction of the rising, lowering and horizontal translation space covered by the cranes in each individual cycle.

The unloading cycle time of a container is however not satisfactory and is heavily conditioned by the time necessary for removal of the twistlocks, a time during which the crane remains stopped to await completion of an operation whose time can vary much depending on various factors such as for example, the skill of the operator, the type and state of preservation of the twistlocks and container, atmospheric conditions in which to operate, et cetera.

The general purpose of this invention is to remedy the above-mentioned shortcomings by making available a container loading and unloading system allowing high operating speeds with a substantial reduction in the time necessary to transfer a container between a ship and a warehouse while at the same time ensuring that the operators work in fully safe conditions.

SUMMARY OF THE INVENTION

In view of this purpose it was sought to provide in accordance with this invention a system on land for transferring containers between ship and land including container loading and unloading cranes and container transfer stations operationally associated with the cranes and characterized in that the transfer stations include an upper platform for receiving and support of a container from and to a crane and a lower platform for container loading and unloading within and outside of the station with there being between the upper and lower platforms centering and lifting means performing transfer of a container between the two superimposed platforms without intervention of the crane.

BRIEF DESCRIPTION OF THE DRAWINGS

To clarify the explanation of the innovative principles of this invention and its advantages compared with the prior art there is described below with the aid of the annexed drawings a possible embodiment thereof by way of non-limiting example applying said principles. In the drawings.

DETAILED DESCRIPTION OF THE INVENTION

Figure 1:
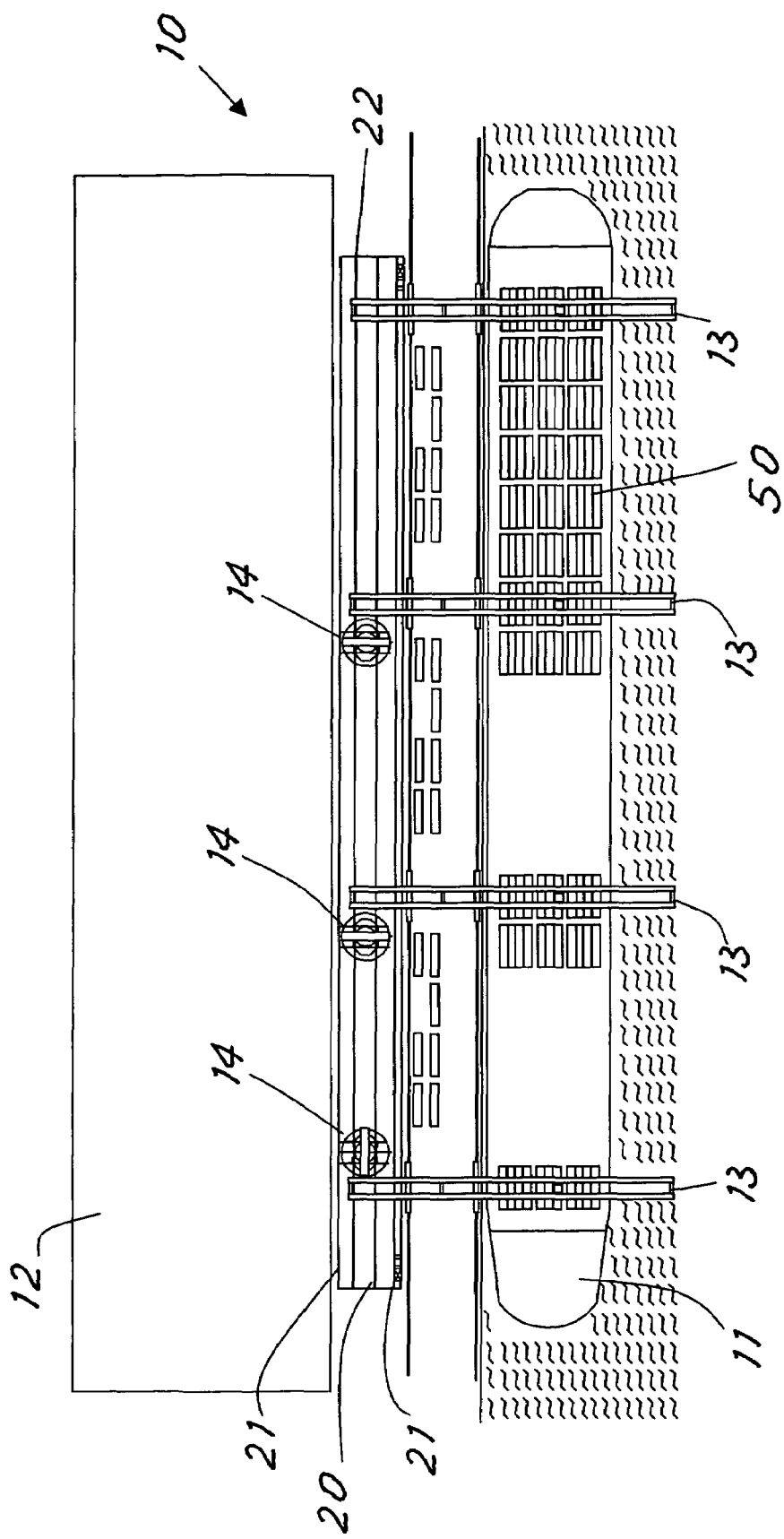
FIG. 1 shows a diagrammatic plan view of a container loading and unloading zone between a ship and land with the system in accordance with this invention.

With reference to the figures, FIG. 1 shows a system 10 in accordance with this invention for transfer of containers 50 between a ship 11 and a storage warehouse 12. The system includes wharf cranes 13 and transfer stations 14. The stations can be for example, in the same number as the cranes or there can be more cranes which use the same station alternately. The transfer stations are placed between the wharf cranes and the reception station or stations of the containers on land, for example, in the automatic warehouse).

Figure 2:
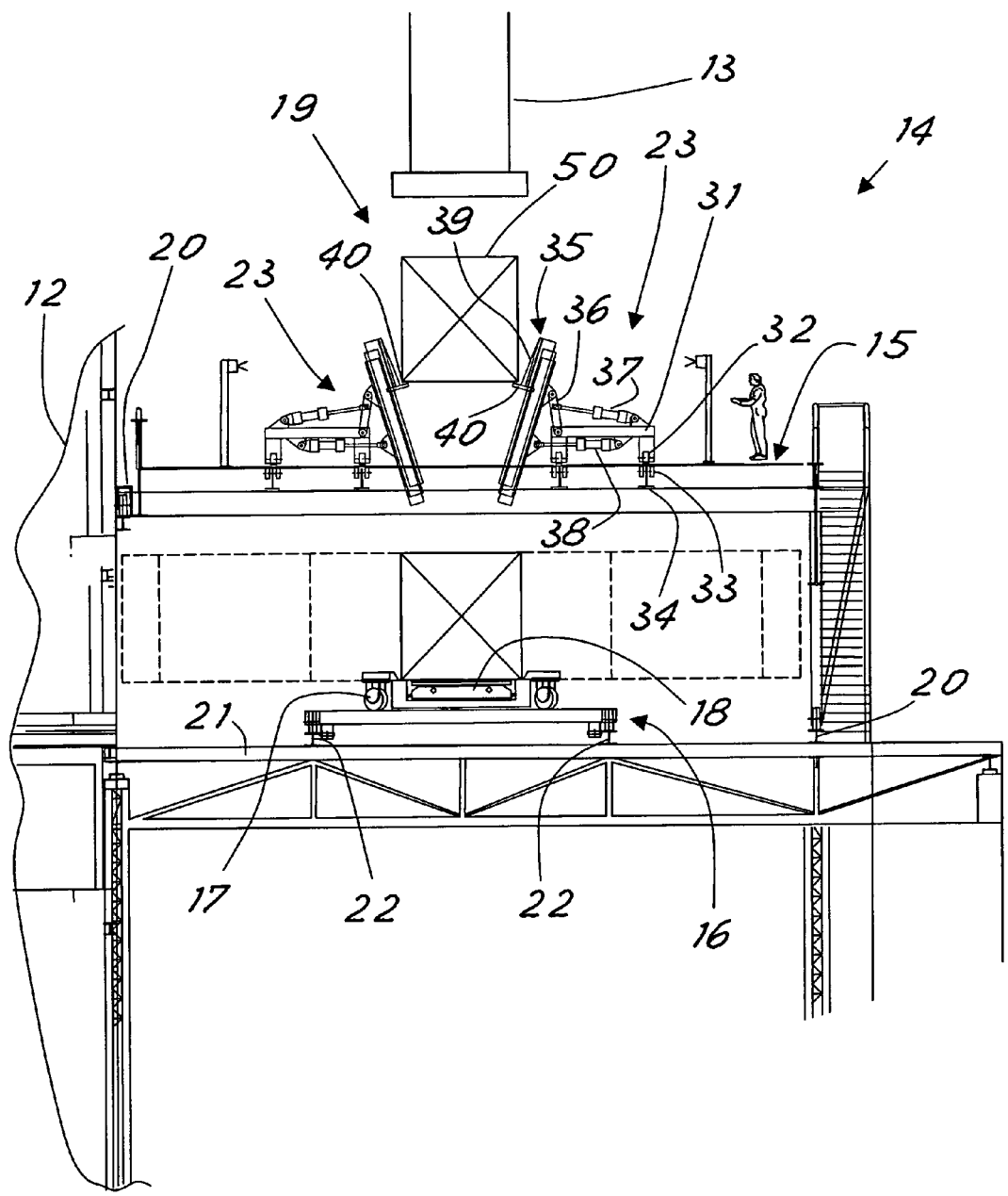
FIG. 2 shows a diagrammatic side elevation view of a transfer station in the system of FIG. 1.

As may be seen well in FIG. 2, the transfer stations 14 between crane and warehouse interior include a movable upper platform 15 and a lower platform or shuttle 16. The shuttle 16 includes in turn a revolving distributor trolley 17 complete with ensiling car (extractor) 18.

The upper platform is designed to receive a container from one of the cranes 13 and pass it to an underlying shuttle 16 by means of its own centering and transfer unit 19. The platform 15 rests on wheels which run on two rails 20 parallel to the direction of movement of the cranes along the ship and the inlet-outlet face of the warehouse and which are respectively supported on one side on the pavement 21 of the load-unload level and on the other side on the shelving at a height allowing passage of the container beneath the platform 15 for entry into the warehouse 12.

The shuttle 16 receives the container on the ensiling trolley 18. The corresponding trolley 17 can rotate 90° around a vertical axis to take the container from a position (shown in solid lines in FIG. 2) which is parallel to the wharf to a position (broken lines in FIG. 2) of introduction into the warehouse. Advantageously the rotating platform can rotate 90° either clockwise or counterclockwise allowing thus to present toward the shelves of the warehouse either end of the container depending on necessity (for example, the side of refrigerated containers bearing the connection cable must be oriented toward the side of the ship or the shelving where the appropriate power outlets are available).

When the platform is rotated in the insertion position, the ensilage trolley 18 extends from the trolley to perform introduction of the container into the warehouse and withdraw again onto the trolley.

These mechanisms are readily imaginable in themselves to the technician and will not be described nor shown here again.

Advantageously the shuttle 16 can be equipped with a predetermined longitudinal excursion in relation with the predetermined load and unload position so as to be able to unload and load the container directly in one of the predetermined zones of insertion of the containers in the warehouse. For this purpose the shuttle can run on rails 22 parallel to a running direction of the cranes along the ship.

The unit 19 with which the upper platform is equipped is made up of four telescopic hoists 23 arranged (as may be seen in FIG. 3) near the four corners of the receiving zone of a container by the crane.

Figure 3:
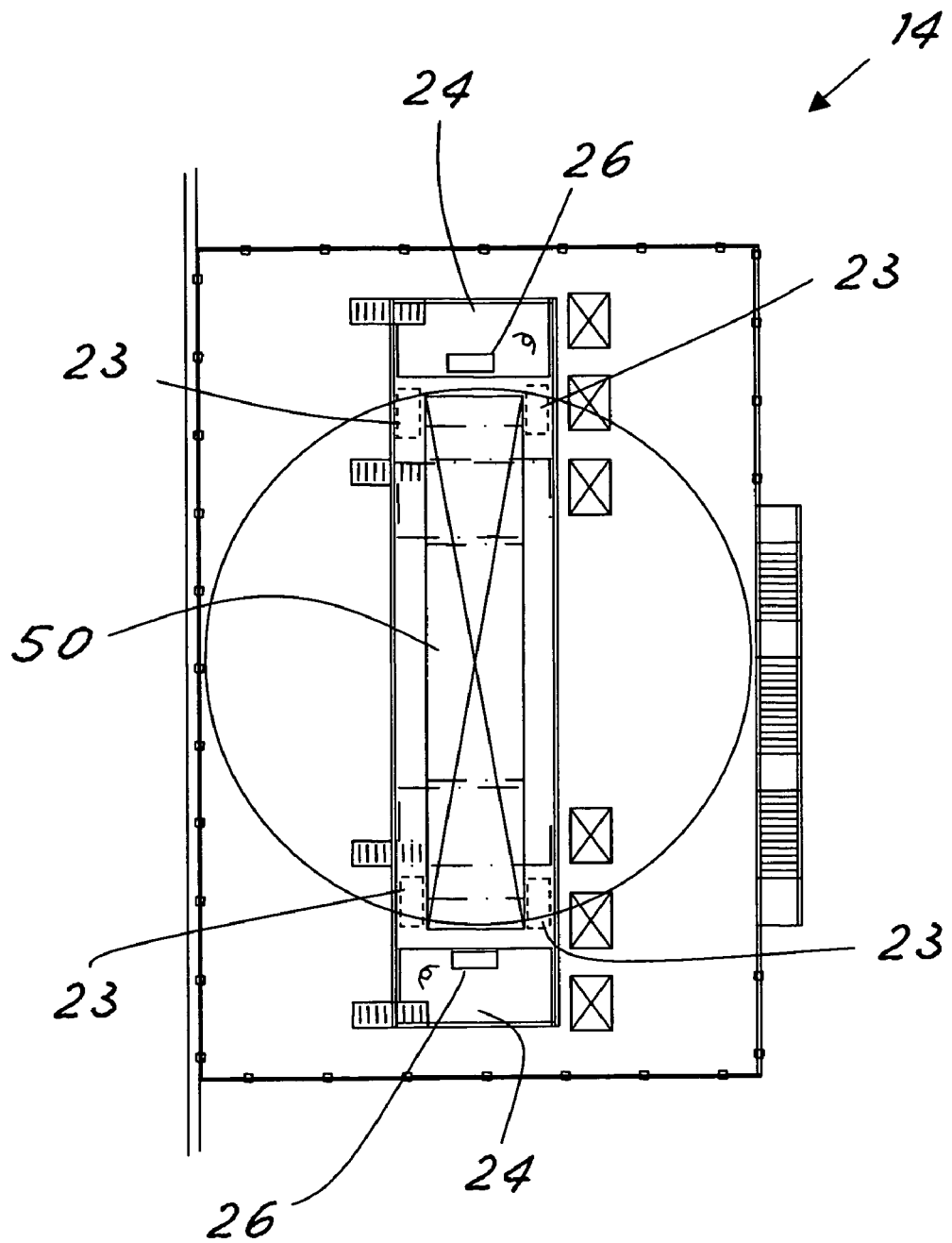
FIG. 3 shows a diagrammatic plan view of the transfer station of FIG. 2, FIG. 4 show another detail of the station of FIG. 2 with centering devices and with a working position for operators assigned to removal of twistlocks.

As may be seen in the layout of FIG. 3, the upper platform 15 includes advantageously two positions 24 placed at the short ends of the container reception zone. Each of these positions supports a pair of hoists 23 and is powered to be movable in the direction parallel to the axis along the container and to be able to draw near and away from the other position. This allows adapting the platform to containers of different lengths. The movement of the positions 24 can be controlled by a containers size detector or on command of the operators.

Figure 4:
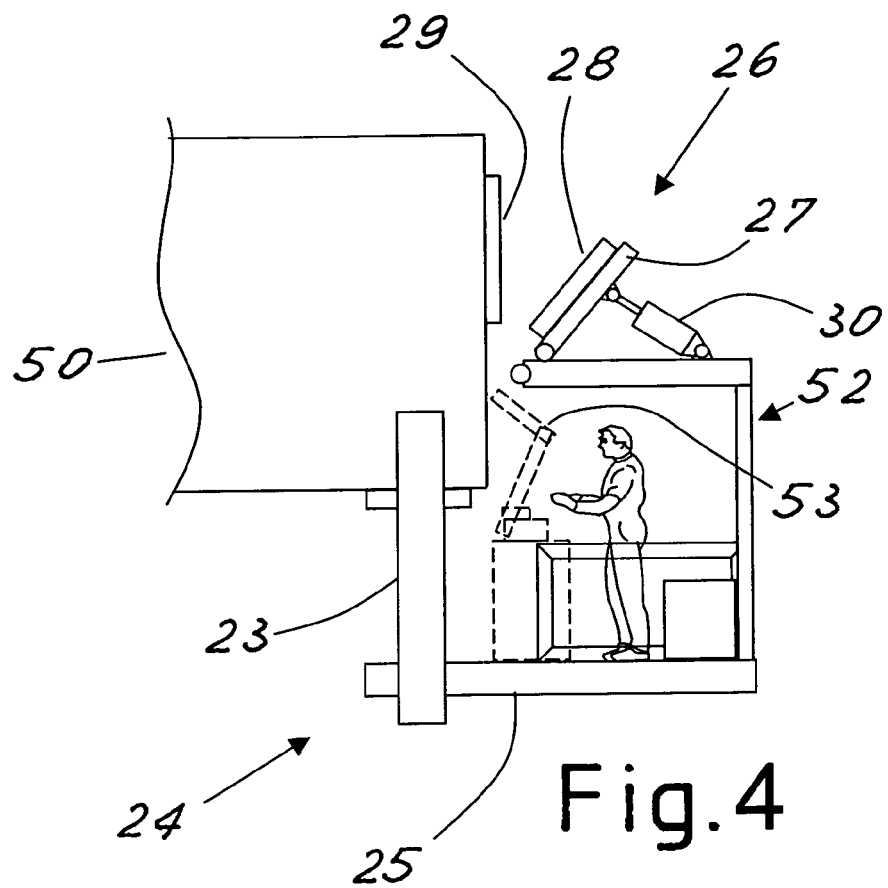

FIG. 4 shows one of such positions 24 while the other is basically the same. The position includes a movable footboard 25 whose structure carries the two telescopic hoists 23, a longitudinal centerer 26 and an operator protection structure 52 (for example, against material falling from above such as twistlocks or the contents of the container which opened or broke). The operator can walk on the footboard to remove the twistlocks from the end of the container. The footboard can include containers for the removed twistlocks and also known equipment for reading codes of transferred containers.

Insertion and removal of the twistlocks is advantageously performed manually because of the great variety of twistlocks. The twistlock insertion and removal operations can also be performed by appropriate robotized means 53 instead of by the operators. This is especially possible in case of standardization of twistlock types used.

The longitudinal centering device 26 is advantageously made up of an articulated arm 27 bearing guides 28 in suitable plastic or special wear-proof steel shaped so as to couple with the surfaces 29 of the front and rear parts of the containers which are normally provided to guide it. Movement of the arm is controlled by one or two hydraulic cylinders 30. The centering device can also be made up of a pair of articulated arms 27 each controlled by its own cylinder.

The actuators of the centering devices are advantageously provided with a control system of the force exerted which allows damping of the swinging of the container.

The operator protection structure can be made up of a stout framework supporting the longitudinal centering device and constitutes protection against accidental container movements due to wind, uncertainty in handling of the crane, or any falling of the load from containers which might be accidentally opened during unloading. The framework can be covered on the three sides not opposite the container with transparent panels so as to protect the operator from wind, rain or snow. In severe climates, working conditions of the operators can be further improved by inserting radiant panels or other known heating systems in the protective structure.

Returning to FIG. 2, each hoist 23 includes a base frame 31 which is supported by support wheels 32 and contrast wheels 33 to be able to move along running beams 34 controlled by a suitable actuator or known type (hydroelectric) not shown.

The base frame 31 supports a telescopic upright 35 by means of an articulated arm 36. The position and tilt of the telescopic upright is determined by the combined action of two hydraulic cylinders 37, 38 the upper one of which performs mainly the function of dampening and the lower that of orientation. The tilt actuators are advantageously provided with a control system of the force exerted so as to allow dampening of the swinging of the container lowered between them.

Figure 5:
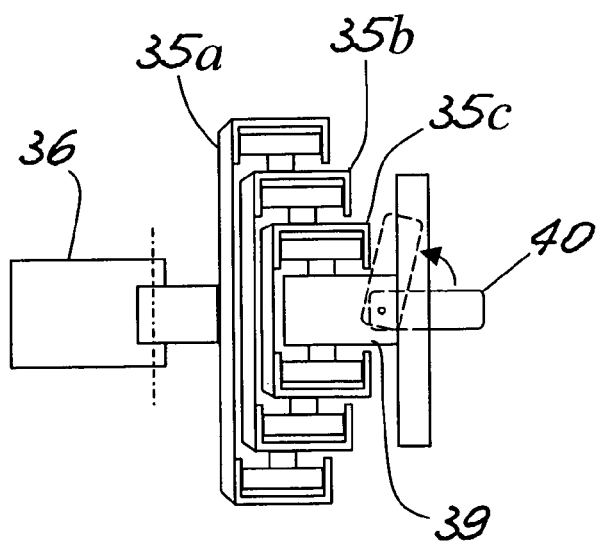
FIG. 5 shows an enlarged cross-section view of a telescopic upright of the station of FIG. 2, and FIGS. 6 and 7 show diagrammatic views similar to that of FIG. 2 of the transfer station in various operating steps.
Figure 6:
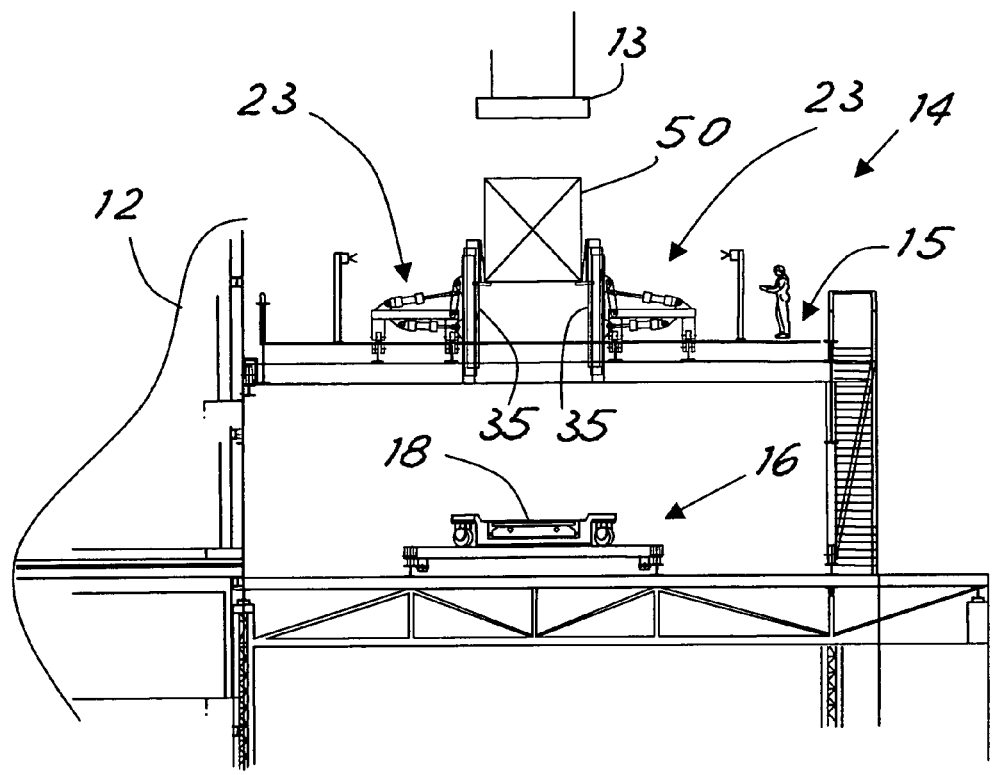
Figure 7:
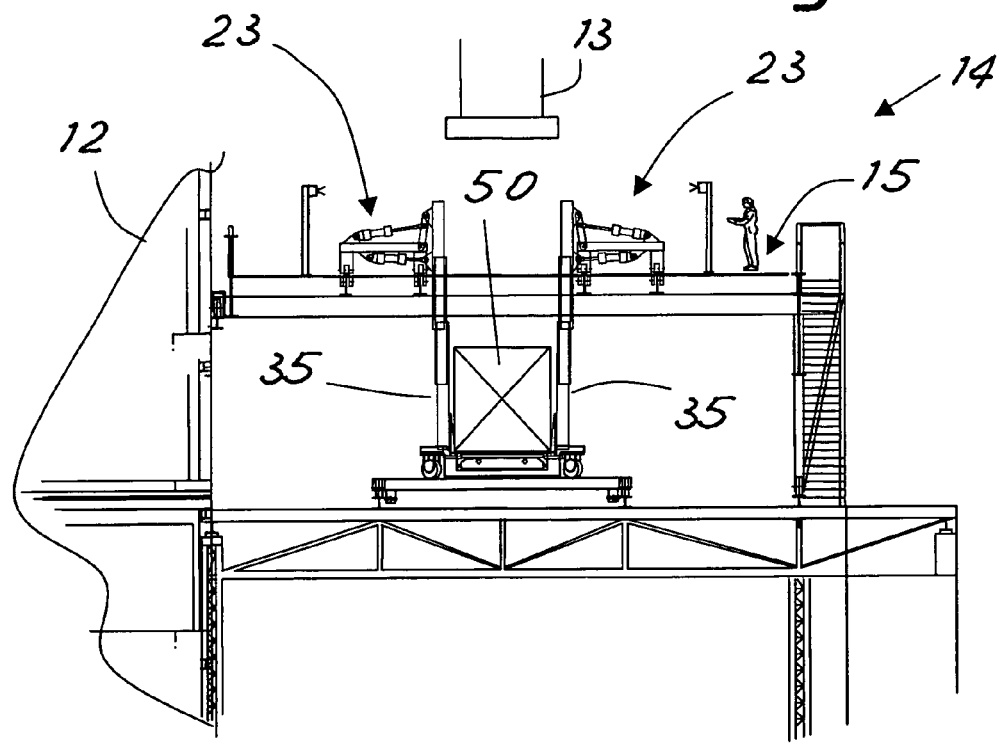

As is clear from the cross section of FIG. 5 and FIG. 7, the telescopic upright 35 is in turn made up of three parts 35a, 35b, 35c mutually running by means of guide wheels and lengthening power (not shown).

Part 35a, more outward, is connected to the arm 36 and to the actuator 38 so as to be basically without vertical movement but it has the ability of performing a rotation movement around the upper axis of the arm 36.

The movable part 35c runs on the movable part 35b which runs on the part 35a. On the part 35c runs a slider 39 of reduced length compared with the two movable parts 35 and which ends with a projecting shelf 40.

Advantageously the slider 39 bears a special wedge-shaped wear proof plastic or steel guide for guiding a container towards the container support shelf 40.

As may be seen in FIG. 5 the shelf 28 when not loaded with the weight of the container can be oriented in a position (shown in broken lines) which does not interfere with the container and allows passage of the slider beside the container after the container has been set down on the ensilage trolley 18.

During operation of the system, the cranes position a container vertically over a transfer station and set it on the shelves of the telescopic hoists as shown in FIG. 2. The tilted 'funnel' positioning of the hoists combined with the dampened oscillation of the articulated arms 36 (thanks to the action of the tilt actuators) dampens the swinging of the container suspended from the crane and centers the container in the station. The hoists are moved by the pistons to be arranged vertically so that the crane can rest the container finally and free itself and immediately start a new unloading cycle from the ship.

Once the container is supported by the centering and transfer unit 19, the operators on the footboards 24 come close and can remove the twistlocks while working on a firmly supported container instead of suspended on a pair of cables as occurs in the known art. After removing the twistlocks the operators withdraw from the container and by means of a safety button allow the unit 19 to descend and set down the container on the trolley below, which constitutes the entrance to the warehouse. This is shown in FIG. 7.

The orientation of the container for introduction into the warehouse can be obtained by choice with clockwise or counterclockwise rotation, for example to orient the container side equipped with doors or power outlets for a refrigerated system depending on needs.

After having set down the container, the unit 19 takes the telescopic uprights back on high and arranges itself to receive a new container while taking the hoists back into the tilted configuration of FIG. 2.

The shifting of the platform is obtained by means of electric motors and its position can be determined by the position which the crane assumes for unloading or loading a certain row of containers. Synchronism between the two positions is obtainable advantageously automatically by means of the position data which from the crane control system reach the warehouse control system, which consequently governs the position of the transit stations. The position of the stations can also be 'adjusted' with a manual command by the crane operator if particular operating conditions make it necessary.

Advantageously, the platform is stopped for all the time used by the crane for unloading and loading a row of containers (bay) from or onto the ship. The platform moves at low speed together with the crane only when the crane moves to go to another bay. In this manner the personnel on the platform can work in safe conditions without jolts or unnecessary movements of the platform.

To optimize the load and unload cycle, the rotation movement can take place simultaneously with the translation movement from and to the entry-exit cell of the warehouse container.

The advantages of the solution of this invention are immediately clear. First of all, the substantial time saving obtained on the wharf crane cycle compared to the known is clear. Indeed, the crane need no longer wait to completely dampen alone the swinging of the container nor wait until the twistlocks removal operation is done, which, in addition to being long, is above all difficult to determine due to the variability of the factors which influence it. In addition, the crane need no longer perform a starting, a descending run, or a slowing followed by a short run at micrometric speed necessary for setting the container on the ground or on a vehicle. The increase in productivity involves a considerable resulting reduction in the costly time of stopping a ship in the port.

There is also a substantial increase in the time available for the operators assigned to removal of the twistlocks and to registration of the container data since from the total time cycle only the time for reduced setting down run need be detracted from the twistlocks removal point to setting on the trolley of entry into the warehouse, the time for return into high position of the empty hoist and the time of setting down of the container on the centering and transfer unit.

The time available for removal of the twistlocks is more even than that obtainable with known double-winch cranes. Indeed, in the case of double-winch cranes, the times to be detracted from the total time cycle are the container centering time and for taking from the waiting position, the time of a brief rise to disconnect the container from the waiting position, the time for lateral shifting to round the waiting position, the time of descent to the twistlock removal position, the time of dampening the oscillations of the container, the time for descent from the twistlock removal position to earth, the time of return to waiting position for taking the next container (rise, lateral shifting, descent).

It should be noted that the increase of time available for removal of the twistlocks is obtained also considering utilization of conventional cranes presently in operation, including the older ones, not yet equipped with recent oscillation dampening systems. This involves the economical benefit of not making necessary the purchase of new cranes and also being subjected to the cost of a second crane operator for handling the second winch for each of three work shifts.

Breaking up of the total transfer cycle from the ship to the warehouse using the system in accordance with this invention also has the advantage that it allows good flexibility when starting the operation and gives the personnel time for a visual check of the state and integrity of the container seals, checking whether the code reading cameras have read the codes correctly and for any correction with manual keying in.

From the safety viewpoint, there is obtained a considerable increase since those assigned to twistlock removal can wait quietly in a safe position until the crane has set down the container on the four rests of the hoist, instead of waiting for the container to reach the working height remaining in the immediate neighborhood of the container which is descending in order to save precious time.

The same twistlock removal operation performed on a stopped and rigidly constrained container is of course safer.

By setting down all the containers in a single position, it is also possible to create around the working zone effective shelters from the wind and in part also for rain and snow, possibly heated by radiant panels, something impossible with known structures with cranes which set down containers in different and continually varying positions. It is now clear that the preset purposes have been achieved by obtaining considerable increase in the productivity of the cranes, above all giving much more time to the operators for performing manual operations, and with considerable advantages for the working environment and safety of the operators.

Naturally the above description of an embodiment applying the innovative principles of this invention is given by way of non-limiting example of said principles within the scope of the exclusive right claimed here. For example, in the above description the cycle of unloading from the ship is described for clarity but it must be clearly understood that, by changing the terms, all of the description would be valid even for the reverse loading cycle of the container onto the ship. In addition, if the structures on land had different requirements of introduction and/or extraction of containers, the lower receiving station could be different from that described with revolving platform and insertion and/or extraction trolley.

Even the exact sequence of operations for performance of a cycle can vary depending on specific requirements. For example, the two stories of each station can move independently to parallelize the operations more.

What is claimed is:

1. A system on land for transfer of containers between ship and land, said system comprising cranes for loading or unloading containers, and transfer stations for transfer of containers operationally associated with the cranes, the transfer stations including an upper platform for reception and support of a container from and to one of the cranes, and a lower platform for loading or unloading of containers into or out of the station, and a centering and elevator device operationally present between the upper platform and the lower platform, the centering and elevator device receiving and sending said container directly from and to said one of the cranes at the upper platform and performing transfer of said container between the upper platform and the lower platform without intervention of said one of the cranes, the centering and elevator device including telescopic elevators, the telescopic elevators including actuators for tilting on sides of a container receiving area in the upper platform thereby guiding a container lowered by said one of the cranes on supports of the elevators, the upper platform including two positions placed at short ends of a container reception zone in the upper platform with each of said two positions bearing a pair of said telescopic elevators and powered to be mobile in a direction parallel to a long axis of the container and able to approach and withdraw from the other position.

2. The system in accordance with claim 1, wherein each position includes centering means for longitudinal centering of the container between the positions.

3. The system in accordance with claim 2, wherein the centering means included dampened elements for thrust against ends of the container.

4. The system in accordance with claim 1, wherein each of said two positions has a zone for reception of operators who must interact with the container transiting in the upper platform.

5. The system in accordance with claim 4, wherein the operator reception zone is equipped with paneling for protection of the operator from atmospheric agents and/or heating means.

6. The system in accordance with claim 1, wherein the operator reception zone is equipped with a structure for protection of the operator.

7. The system in accordance with claim 1, wherein the upper platform slides parallel to a direction of the one of the cranes running along the ship.

8. The system in accordance with claim 7, wherein a position of the upper platform is automatically synchronized with a position of a wharf crane with which the upper platform interfaces.

9. The system in accordance with claim 1, wherein the lower platform has a container support carriage which is orientable on command to rotate a container between a direction parallel to a direction of reception of the containers on the upper platform and the loading or unloading direction of containers within and outside of the station.

10. The system in accordance with claim 9, wherein the support carriage includes powered means of horizontal movement of the containers in the loading or unloading direction of the containers within or outside of the station.

11. The system in accordance with claim 1, wherein the lower platform runs parallel to a running direction of the cranes along the ship.

12. The system in accordance with claim 1, further comprising a warehouse served by the lower platforms of the stations for withdrawing containers from or introducing containers into the warehouse.

13. The system in accordance with claim 1, wherein the tilting actuators of the telescopic elevators are provided with a control of force exercised to supply a damping function of container swinging.

14. The system in accordance with claim 1, further comprising robotized means for twistlock insertion and removal operation.

* * * * *

UNITED STATES PATENT AND TRADEMARK OFFICE
CERTIFICATE OF CORRECTION

PATENT NO. : 7,665,945 B2 Page 1 of 1
APPLICATION NO. : 11/634279
DATED : February 23, 2010
INVENTOR(S) : Gaetano Di Rosa It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 329 days.

Signed and Sealed this

Seventh Day of December, 2010

David J. Kappos
*Director of the United States Patent and Trademark Office*